(12) United States Patent
Sul et al.

(10) Patent No.: US 11,907,602 B2
(45) Date of Patent: Feb. 20, 2024

(54) CASCADED DISPLAY DRIVER IC AND MULTI-VISION DISPLAY DEVICE INCLUDING THE SAME

(71) Applicant: Magnachip Semiconductor, Ltd., Cheongju-si (KR)

(72) Inventors: Jung Hoon Sul, Seoul (KR); Myung Woo Lee, Seongnam-si (KR); Seung Ryeol Lee, Incheon (KR); Duk Min Lee, Seoul (KR)

(73) Assignee: Magnachip Semiconductor, Ltd., Cheongju-si (KR)

( * ) Notice: Subject to any disclaimer, the term of this patent is extended or adjusted under 35 U.S.C. 154(b) by 0 days.

(21) Appl. No.: 17/134,899

(22) Filed: Dec. 28, 2020

(65) Prior Publication Data

US 2021/0365230 A1 Nov. 25, 2021

(30) Foreign Application Priority Data

May 21, 2020 (KR) .......................... 10-2020-0060994

(51) Int. Cl.
*G06F 3/14* (2006.01)
*G09G 3/20* (2006.01)

(52) U.S. Cl.
CPC ............. *G06F 3/1446* (2013.01); *G09G 3/20* (2013.01); *G09G 2300/026* (2013.01); *G09G 2310/08* (2013.01); *G09G 2360/04* (2013.01); *G09G 2370/042* (2013.01); *G09G 2370/10* (2013.01)

(58) Field of Classification Search
CPC ......... G09G 2300/026; G09G 2360/04; G09G 2370/10
See application file for complete search history.

(56) References Cited

U.S. PATENT DOCUMENTS

| 8,508,431 B2 | 8/2013 | Kim et al. | |
|---|---|---|---|
| 2001/0006375 A1* | 7/2001 | Tomooka | G06F 3/1446 345/4 |
| 2004/0217953 A1* | 11/2004 | Someya | G06F 3/1431 345/204 |
| 2007/0241988 A1* | 10/2007 | Zerphy | G06F 3/1446 345/1.1 |

(Continued)

FOREIGN PATENT DOCUMENTS

KR 10-2018-0032738 A 4/2018

*Primary Examiner* — William Boddie
*Assistant Examiner* — Bipin Gyawali
(74) *Attorney, Agent, or Firm* — NSIP Law (57) ABSTRACT

A multi-vision display device includes a timing controller, a plurality of display panels, and a plurality of display driver integrated circuits (ICs). The timing controller is configured to receive source data and timing signals from a host, and generate a data packet comprising image data and control data. The plurality of display driver ICs each is connected to any one of the plurality of display panels. The control data includes a panel identifier indicating a number of display panels of the plurality of display panels connected to the display driver IC prior to a corresponding display panel connected to the display driver IC. Adjacent ones of the plurality of display driver ICs are connected to each other, modulate the panel identifier provided from one among the timing controller and a front end display driver IC, and provide the modulated panel identifier to a rear end display driver IC.

18 Claims, 7 Drawing Sheets

(56) References Cited

U.S. PATENT DOCUMENTS

| | | | |
|---|---|---|---|
| 2012/0319926 A1* | 12/2012 | Koebrich | G09G 3/14 345/1.3 |
| 2015/0187333 A1* | 7/2015 | Loeffler | G09G 5/008 345/1.3 |
| 2016/0093271 A1* | 3/2016 | Cho | H04N 9/12 345/1.3 |
| 2016/0274856 A1* | 9/2016 | Liu | G06F 3/1431 |
| 2016/0300549 A1* | 10/2016 | Zhang | G09G 5/006 |
| 2017/0186370 A1* | 6/2017 | Lee | H04N 13/344 |
| 2019/0295457 A1* | 9/2019 | Li | G09G 3/32 |
| 2021/0081159 A1* | 3/2021 | Kaneko | G06F 3/1446 |
| 2021/0165626 A1* | 6/2021 | Yamamoto | G06F 3/1446 |
| 2021/0201746 A1* | 7/2021 | Seo | G09G 3/3233 |

\* cited by examiner

CASCADED DISPLAY DRIVER IC AND MULTI-VISION DISPLAY DEVICE INCLUDING THE SAME

CROSS-REFERENCE TO RELATED APPLICATIONS

This application claims the benefit under 35 USC 119(a) of Korean Patent Application No. 10-2020-0060994 filed on May 21, 2020, in the Korean Intellectual Property Office, the entire disclosure of which is incorporated herein by reference for all purposes.

BACKGROUND

1. Field

The present disclosure relates to a cascade-connected display driver integrated circuit (IC) and a multi-vision display device including the same.

2. Description of the Related Art

With the development of this information age, various types of display devices are being developed. Examples of display devices include Liquid Crystal Display (LCD), Plasma Display Panel (PDP), Organic Light Emitting Display (OLED), and Micro Light Emitting Display (Micro-LED).

Typically, such display devices are used individually but there are systems that connect and use a plurality of display devices to implement a larger display device, for example, a multi-vision device, digital signage, etc.

As such, so as to connect and use the plurality of display devices, image data signals and control data signals are individually transmitted from a host system to each of the display devices, and the image data and control data respectively received by each display device may be processed and displayed on the screen. Also, when the display devices are successively connected and a data stream is transmitted from the host system, each of the display devices may identify its own data and output to the screen.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a multi-vision display device includes a timing controller, a plurality of display panels, and a plurality of display driver integrated circuits (ICs). The timing controller is configured to receive source data and timing signals from a host, and generate a data packet comprising image data and control data. The plurality of display driver ICs each is connected to any one of the plurality of display panels. The control data includes a panel identifier indicating a number of display panels of the plurality of display panels connected to the display driver IC. The plurality of display driver ICs are connected to each other, modulate the panel identifier provided from one among the timing controller and a front end display driver IC, and provide the modulated panel identifier to a rear end display driver IC.

Each of the plurality of display driver ICs may include a receiver, a decoder, a driving unit, a panel identifier modulator, an encoder, and a transmitter. The receiver may be configured to receive the data packet. The decoder may be configured to decodethe received data packet. The driving unit may be configured to use the image data corresponding to the panel identifier, generate a data voltage, and provide the data voltage to the display panel. The panel identifier modulator may be configured to modulatethe panel identifier. The encoder may be configured to encode the data packet to include the modulated panel identifier. The transmitter may be configured to output the encoded data packet to the display driver IC connected to a rear end of the transmitter.

The panel identifier modulator may be configured to increase the panel identifier included in the control data provided from the front end display driver IC by 1 and generate the modulated panel identifier.

The panel identifier modulator may be configured to decrease the panel identifier included in the control data provided from the front end display driver IC by 1 and generate the modulated panel identifier.

The data packet may include a series of data packets of the image data to be displayed on the plurality of display panels during 1 horizontal cycle.

Each of the plurality of display driver ICs may further include a delay unit configured to generate a compensation time based on the panel identifier, cause the driving unit to delay the data voltage by the compensation time, and provide the data voltage to the display panel.

The delay unit may be configured to generate the compensation time based on a delay time per display driver IC, the panel identifier provided to each of the display driver ICs, and the number of connected display devices.

The data packet encoded by the encoder may include data equal to the image data generated by the timing controller.

The rear end display driver IC may be configured to extract the image data corresponding to the modulated panel identifier from the encoded data packet and provide it to the driving unit.

The decoder may be configured to decode a serial data packet received by the receiver and convert into a parallel data packet.

In another general aspect, a display driver IC include a receiver, a decoder, a driving unit, a panel identifier modulator, an encoder, and a transmitter. The receiver is configured to receive a data packet including image data and control data. The decoder is configured to decode the received data packet. The driving unit is configured to use the image data corresponding to a panel identifier included in the control data, and generate a data voltage driving a display panel. The panel identifier modulator is configured to modulate the panel identifier. The encoder is configured to encode the image data and the control data including the modulated panel identifier, and generate the data packet. The transmitter is configured to output the encoded data packet.

The panel identifier modulator may be configured to increase the panel identifier included in the control data provided from the display driver IC connected to a front end of the display driver IC or a timing controller by 1 and generate the modulated panel identifier.

The panel identifier modulator may be configured to decrease the panel identifier included in the control data provided from the display driver IC connected to a front end of the display driver IC or a timing controller by 1 and generate the modulated panel identifier.

The display driver IC may further include a delay unit configured to generate a compensation time based on the panel identifier, cause the driving unit to delay the data voltage by the compensation time, and provide the data voltage to the display panel.

The delay unit may be configured to generate the compensation time based on a delay time per display driver IC, the panel identifier provided to each of the display driver ICs, and the number of connected display devices.

The data packet encoded by the encoder may include data equal to the image data included in the received data packet.

The display driver IC connected to a rear end of the display driver IC may be configured to extract the image data corresponding to the modulated panel identifier from the encoded data packet and provides to the driving unit.

The decoder may be configured to decode a serial data packet received by the receiver and convert into a parallel data packet.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways, as will be apparent after an understanding of the disclosure of this application. Further, although the examples described herein have a variety of configurations, other configurations are possible, as will be apparent after an understanding of the disclosure of this application.

A purpose of the present disclosure is to provide a display driver IC which can be cascade-connected, can identify data provided from a host and output the data to a display panel connected to the display driver IC.

Another purpose of the present disclosure is to provide a multi-vision device including the cascade-connected display driver IC.

Figure 1:
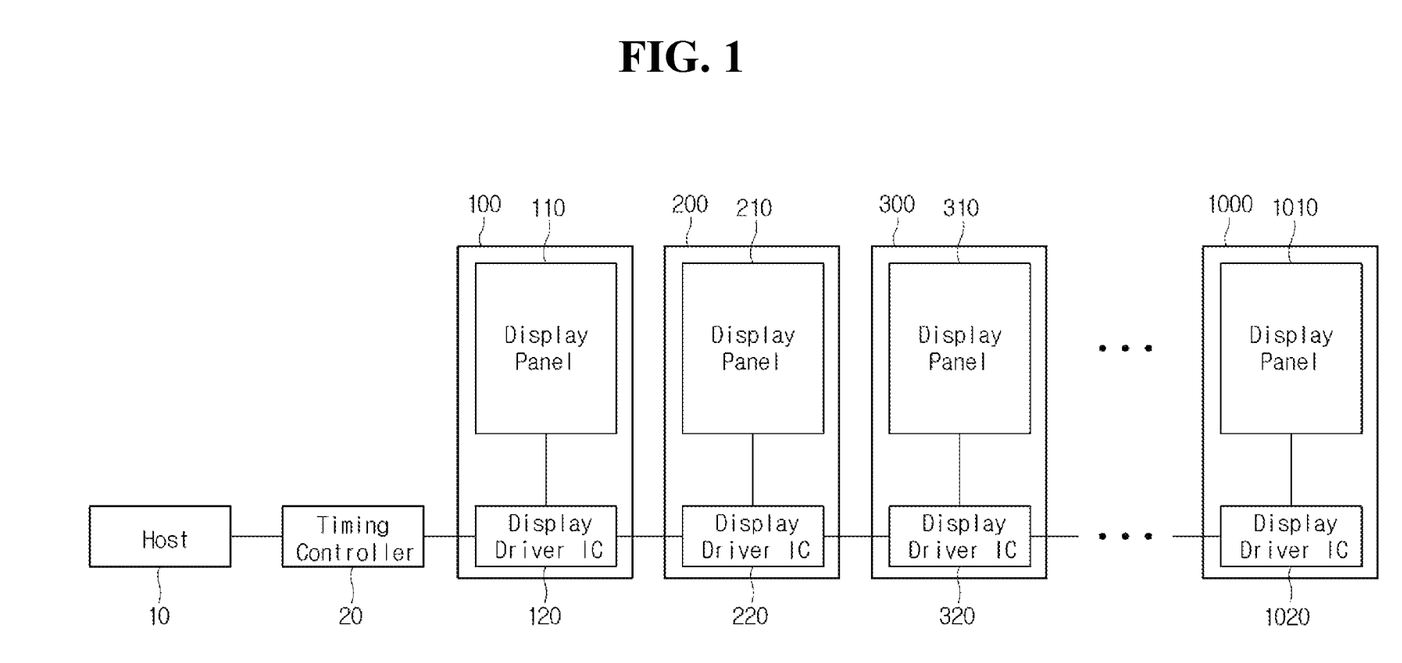
FIG. 1 is a diagram illustrating an example of a configuration of a multi-vision display device.

FIG. 1 is a diagram illustrating an example of a configuration of a multi-vision display device.

In FIG. 1, a multi-vision display system, in one or more examples, may include a host 10, a timing controller 20, and a plurality of display devices 100, 200, 300, . . . , and 1000.

The host 10 may generate source data and timing signals and provide them to the timing controller 20. The host 10 may include, for example, a personal computer (PC), a server, an integrated circuit included in an entertainment system, a system on a chip (SoC), an application processor (AP), a mobile AP, or the like.

The host 10 may control the operation of the timing controller 20. The host 10 and the timing controller 20 may be connected through various standard interfaces used in industry.

The timing controller 20 may receive the source data and the timing signals, such as a vertical synchronization signal Vsync, a horizontal synchronization signal Hsync, a data enable signal DE, and a clock CLK, etc., from the host 10. The timing controller 20 may generate control data 31 for controlling an operation timing of display driver ICs 120, 220, 320, . . . , and 1020 on the basis of the timing signal provided from the host 10. The generated control data 31 may be provided from the timing controller 20 to the first display driver IC 120.

The timing controller 20 may provide generated image data 32 and control data 31 to the display driver IC 120 in a serial data packet format. The data provided by the timing controller 20 to the display driver IC 120 will be described in more detail with reference to FIG. 3, etc.

The timing controller 20 may be connected to the plurality of display devices 100, 200, 300, . . . , and 1000. The timing controller 20 may be directly connected to the first display driver IC 120 of the first display device 100.

The multi-vision display system may include the plurality of display devices 100, 200, 300, . . . , and 1000. Each of the display devices 100, 200, 300, . . . , and 1000 may be connected to another display device or the timing controller 20 through the display driver ICs 120, 220, 320, . . . , and 1020 mounted on the display device. The plurality of display devices 100, 200, 300, . . . , and 1000 or the plurality of display driver ICs 120, 220, 320, . . . , and 1020 included in the plurality of display devices 100, 200, 300, . . . , and 1000 have a cascaded connected structure.

In this specification, when the plurality of display devices 100, 200, 300, . . . , and 1000 are cascade-connected, it means that the first display device 100 and the second display device 200 are connected to each other, and the second display device 200 and the third display device 300 are connected to each other. Here, in the relationship between the first display device 100 and the second display device 200, the first display device 100 corresponds to a front end display device and the second display device 200 corresponds to a rear end display device. Similarly, in the relationship between the second display device 200 and the third display device 300, the second display device 200 corresponds to a front end display device and the third display device 300 corresponds to a rear end display device.

That is, the image data 32 and the control data 31 provided from the timing controller 20 are provided to plurality of display devices 100, 200, 300, . . . , and 1000. The first display device 100 may be provided with the data packet 30 including the image data 32 and the control data 31 from the timing controller 20. The first display device 100 may display an image on a display panel 110 on the basis of the image data 32 included in the provided data packet 30, and may also provide the data packet 30 to the second display device 200.

Similarly, the second display device 200 may display an image on a display panel 210 based on the image data 32 included in the data packet 30 provided from the first display device 100. The second display device 200 may also provide the data packet 30 to the third display device 300.

This way, the plurality of sequentially connected display devices 100, 200, 300, . . . , and 1000 output the image on the basis of the image data 32 included in the data packet 30 provided from the timing controller 20 or the display device connected to the front end of the plurality of display devices 100, 200, 300, . . . , and 1000. Subsequently, the display device may also transmit the data packet 30 to the display device connected to the rear end. The detailed configuration of the plurality of display devices 100, 200, 300, . . . , and 1000 will be described in more detail with reference to FIG. 2.

Figure 2:
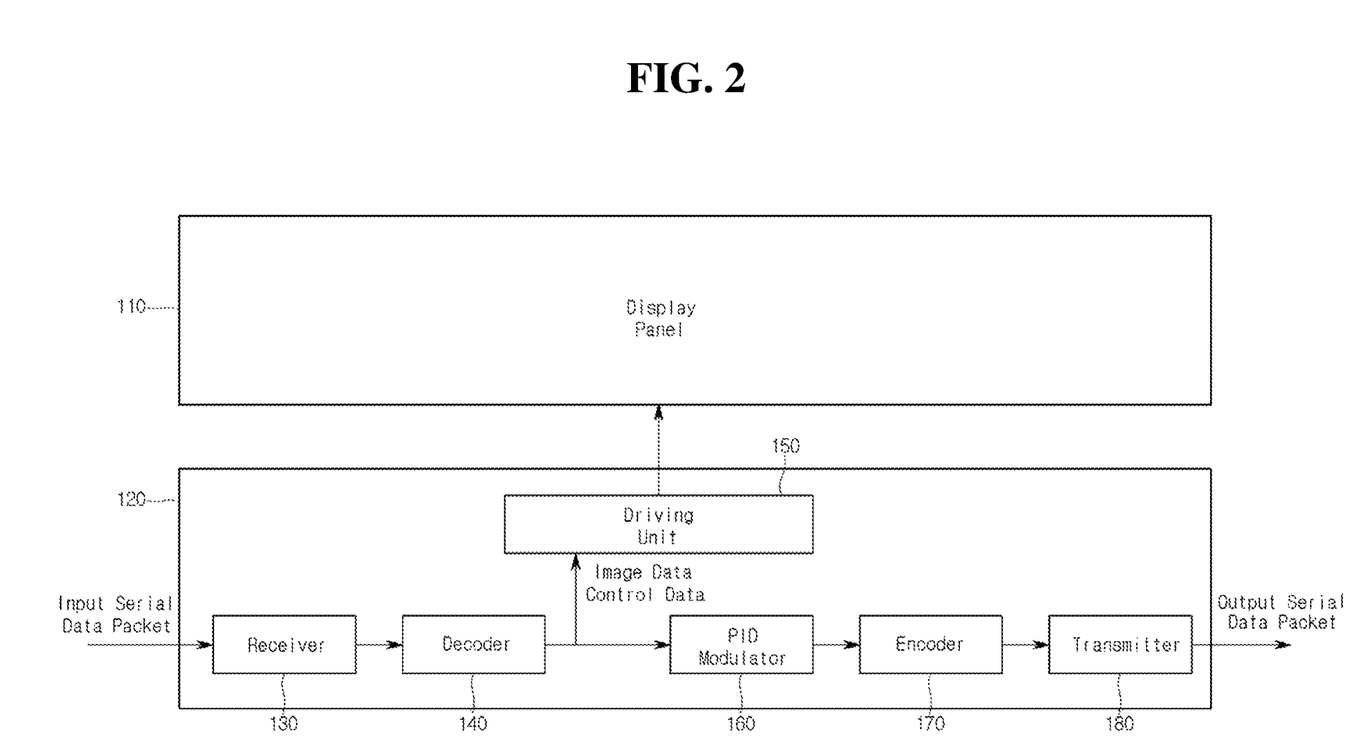
FIG. 2 is a block diagram illustrating an example of a display driver IC of FIG. 1.

FIG. 2 is a block diagram illustrating an example of the display device in one or more examples. In FIG. 2, an illustrative description is made based on the first display device 100, and the described configuration can be applied in the same manner to other display devices 100, 200, 300, . . . , and 1000 connected to the rear end of the first display device 100.

In FIG. 2, for example, the first display device 100 may include the first display panel 110 and the first display driver IC 120.

In the first display panel 110, a plurality of sub-pixels may be formed in the form of a matrix in a portion where a plurality of data lines and gate lines are orthogonal to each other, so that a pixel array is formed. For example, one pixel may be composed of four sub-pixels including red, green, blue, and white sub-pixels, but the present disclosure is not limited thereto.

The first display panel 110 may include, for example, a flat panel such as LCD, OLED, micro-LED, FED, etc., or a flexible panel, but is not limited thereto. Although not shown in FIG. 2, the first display panel 110 may include a gate driver which provides a gate signal to a plurality of vertical lines. The gate driver may have a gate in panel (GIP) method where it is mounted on a display panel.

The first display panel 110 may output an image on the basis of a data voltage and scan signals provided from the first display driver IC 120.

The first display driver IC 120 may include a receiver 130, a decoder 140, a driving unit 150, a panel identifier (PID) modulator 160, an encoder 170, and a transmitter 180.

The receiver 130 may receive a data packet 30 from the outside. The receiver 130 shown in FIG. 2 receives the data packet 30 provided from the timing controller 20. Unlike this, the receiver included in the second display driver IC 220 connected to the rear end of the first display driver IC 120 may receive the data packet 30 from the first display driver IC 120.

The data packet 30 received by the receiver 130 may be decoded by the decoder 140. The decoder 140 may decode a serial data packet 30 and convert it into a parallel data packet 30.

The data packet 30 received by the first display driver IC 120 from the timing controller 20 will be described in more detail with reference to FIG. 3.

Figure 3:
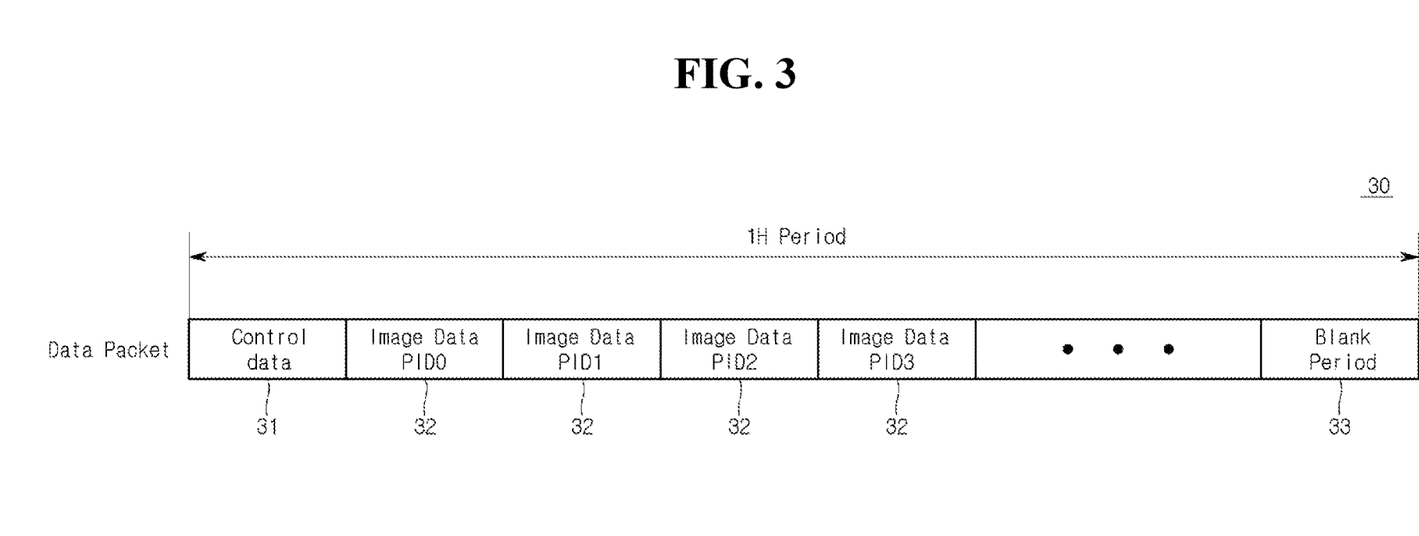
FIG. 3 is a diagram illustrating an example of a structure of a data packet provided to the display driver IC.

FIG. 3 is a diagram illustrating an example of a structure of the data packet 30 provided to the display driver IC in one or more examples.

In FIG. 3, a data packet 30 is a set of data provided during one horizontal (1H) period of writing data to one scan line of the display panel. The data packet 30 may include control data 31 and image data 32 provided to each of the plurality of display devices 100, 200, 300, . . . , and 1000. The end portion of the data packet 30 may include a blank period 33 that demarcates an end of a current data packet 30 from other subsequent data packets. In the data packet 30 received from the timing controller 20, the image data 32 may span another horizontal period or subsequent frame to the blank period 33 in a current frame.

For the purpose of image display, the control data 31 may include data for controlling the display panel 110 and the display driver IC 120. The control data 31 may include a panel identifier (PID) indicating to which display device, among the plurality of display devices 100, 200, . . . 1000, the data packet is provided. Each of the plurality of display devices 100, 200, . . . 1000 comprises a display driver IC and a display panel.

As shown in FIG. 3, the image data 32 included in the data packet 30 may be classified according to the panel identifier (PID). In an example, the image data 32 corresponding to an image to be displayed by the first display device 100 may be classified as PID0, and image data 32 corresponding to an image to be displayed by the second display device 200 may be classified as PID1. If the multi-vision display system of the present disclosure includes n display devices, the data packet 30 may include image data 32 classified as PID0 to PIDn-1.

Each of the plurality of display devices 100, 200, 300, . . . , and 1000 can recognize, through the panel identifier (PID) included in the control data 31, how many display devices have been connected among the plurality of display devices prior to each display device itself. Also, each of the plurality of display devices 100, 200, 300, . . . , and 1000 may extract image data 32 corresponding to a provided respective panel identifier (PID) from the data packet 30 and output as an image.

When the data packet 30 is provided from the timing controller 20 to the first display device 100, the panel identifier may be set to "0". This means that the first display device 100 is the first device connected to the timing controller 20.

The first display driver IC 120 may obtain the panel identifier from the decoded data packet 30. The first display driver IC 120 recognizes that the first image data 32 (Data PID0 of FIG. 3) among the image data 32 included in the data packet should be displayed on the first display panel 110 because the panel identifier has been set to "0".

The first display driver IC 120 may provide the first image data 32 to the driving unit 150, and the driving unit 150 may generate a data voltage to be provided to the first display panel 110 on the basis of the provided image data 32.

Meanwhile, the panel identifier (PID) used to extract the image data 32 may be provided to the panel identifier modulator 160. The panel identifier modulator 160 may then modulate the panel identifier such that the rear end display device receiving the data packet 30 can recognize the connection order. For example, the panel identifier modulator 160 may generate a modulated panel identifier by adding 1 to the panel identifier. Since the panel identifier included in the control data 31 provided to the first display driver IC 120 is "0", the panel identifier modulator 160 may modulate the panel identifier to "1" and provide it to the encoder 170. In some other embodiments, the panel identifier modulator 160 may generate a modulated panel identifier by subtracting 1 from the panel identifier.

The encoder 170 may generate the image data 32 and the control data 31 including the modulated panel identifiers as one data packet 30. The data packet 30 generated from the encoder 170 is the same as the data packet 30 received by the receiver 130 with the exception of the modulated panel identifier. The data packet 30 provided from the transmitter 180 to the rear end display driver IC includes the image data 32 same as the data packet 30 provided by the front end display driver IC.

In summary, the display driver IC according to the embodiment of the present disclosure is provided with the data packet 30 including the image data 32 and the control data 31 from the timing controller or the front end display driver IC. The display driver IC extracts image data 32 to be displayed through the display panel by using the panel identifier included in the control data 31. Then, the display driver IC modulates the panel identifier so that the rear end display device is allowed to use the modulated panel identifier in the image display.

Each of the plurality of display devices included in the multi-vision display system of the embodiment of the present disclosure does not possess a unique panel identifier which indicates how many display devices have been connected among the plurality of display devices prior to each corresponding connected display device. Each of the plurality of display devices extracts the image data 32 to be output by itself, only by using the panel identifier included in the data packet 30 provided from the timing controller or the front end display device, and outputs the extracted image data 32 through the display panel.

Therefore, when a breakdown occurs in any one of the plurality of display devices and replacement is required, a normal operation can be ensured by replacing the device where a breakdown has occurred with a display device the same as the plurality of display devices without additional setting.

Also, when it is intended to configure the multi-vision display system with a new layout, it is only necessary to change the order of the disposition or arrangement of the plurality of display devices, so that a separate setting operation is not essential, which produces advantageous effects on the maintenance.

Figure 4:
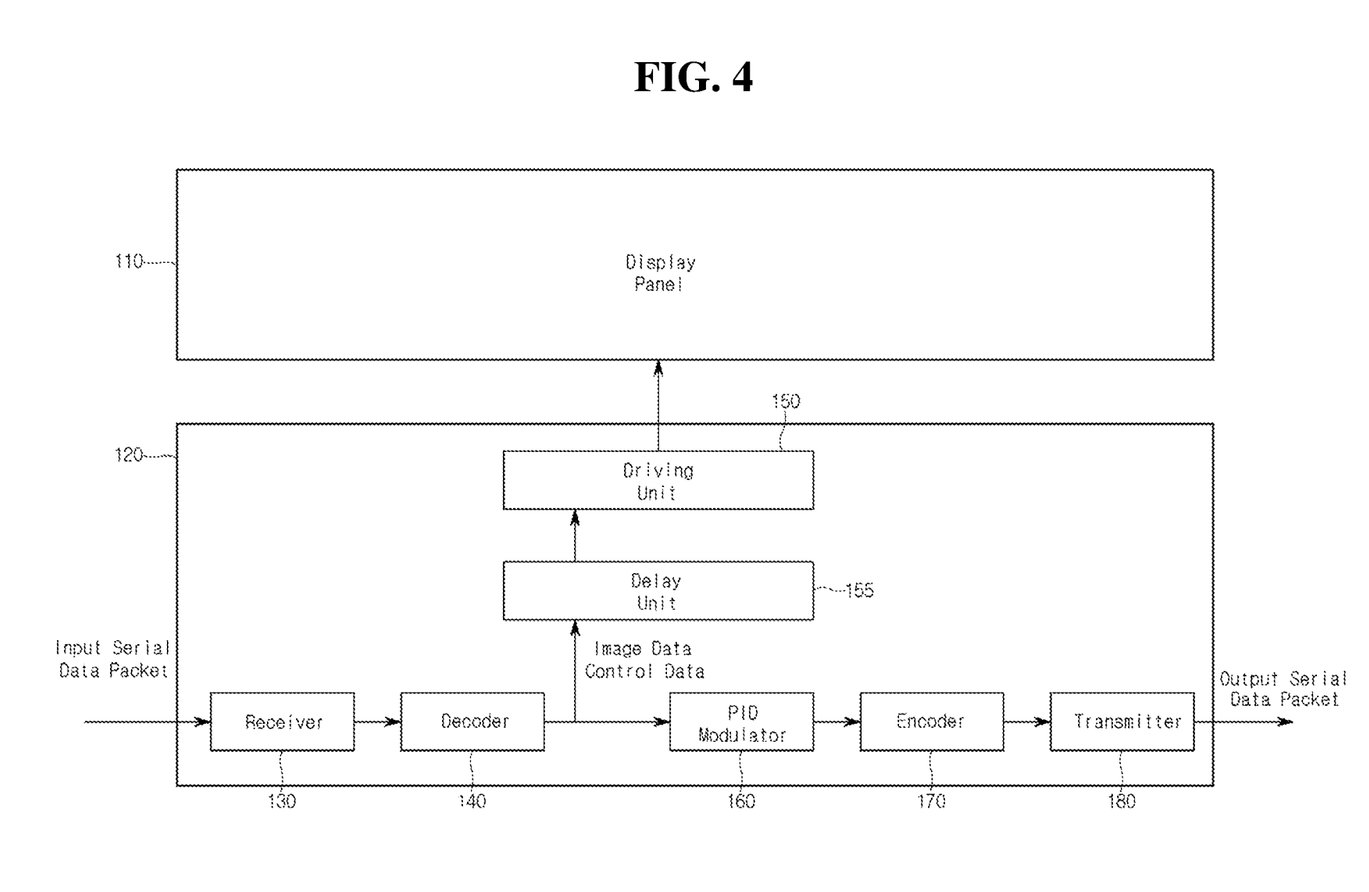
FIG. 4 is a block diagram illustrating an example of the display driver IC.
Figure 5:
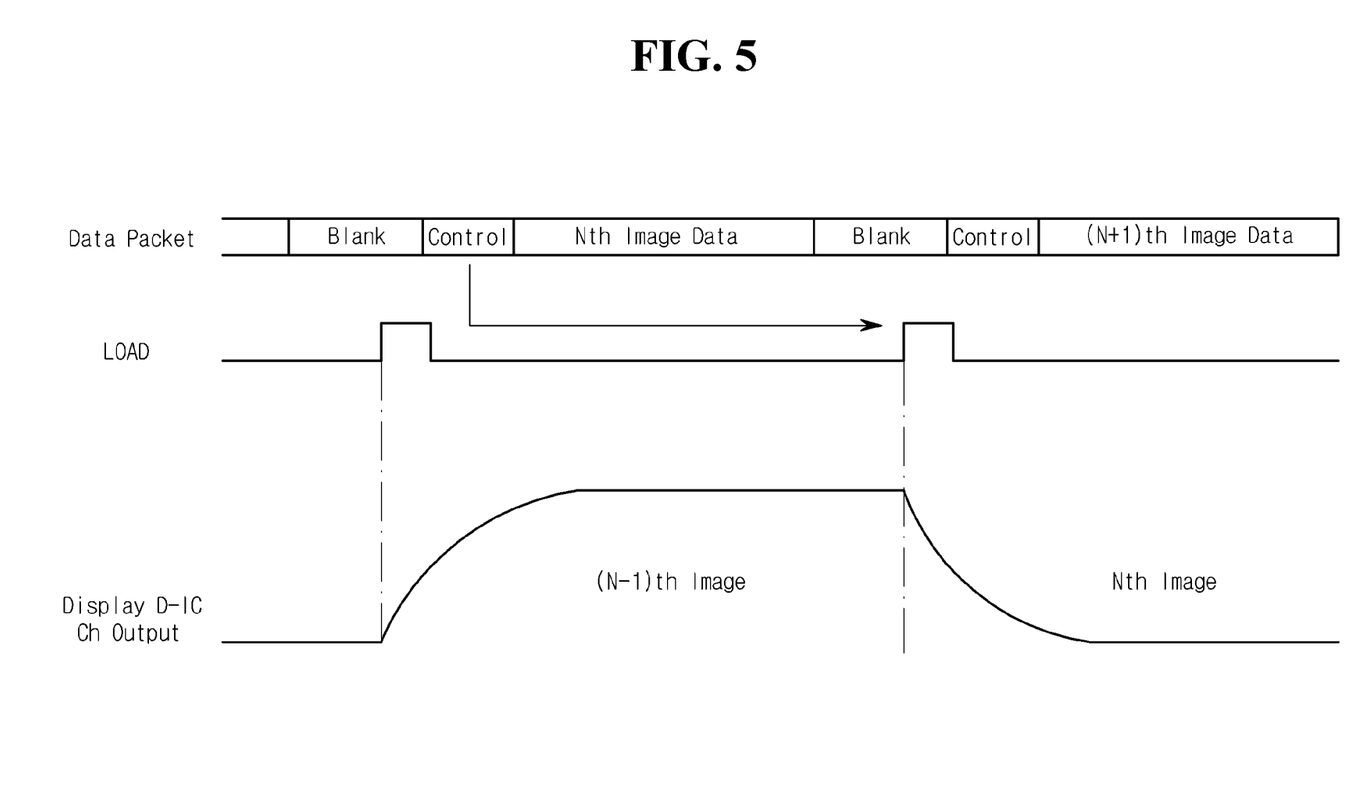
FIG. 5 is a timing diagram illustrating an example of the operation of the display driver IC.
Figure 6:
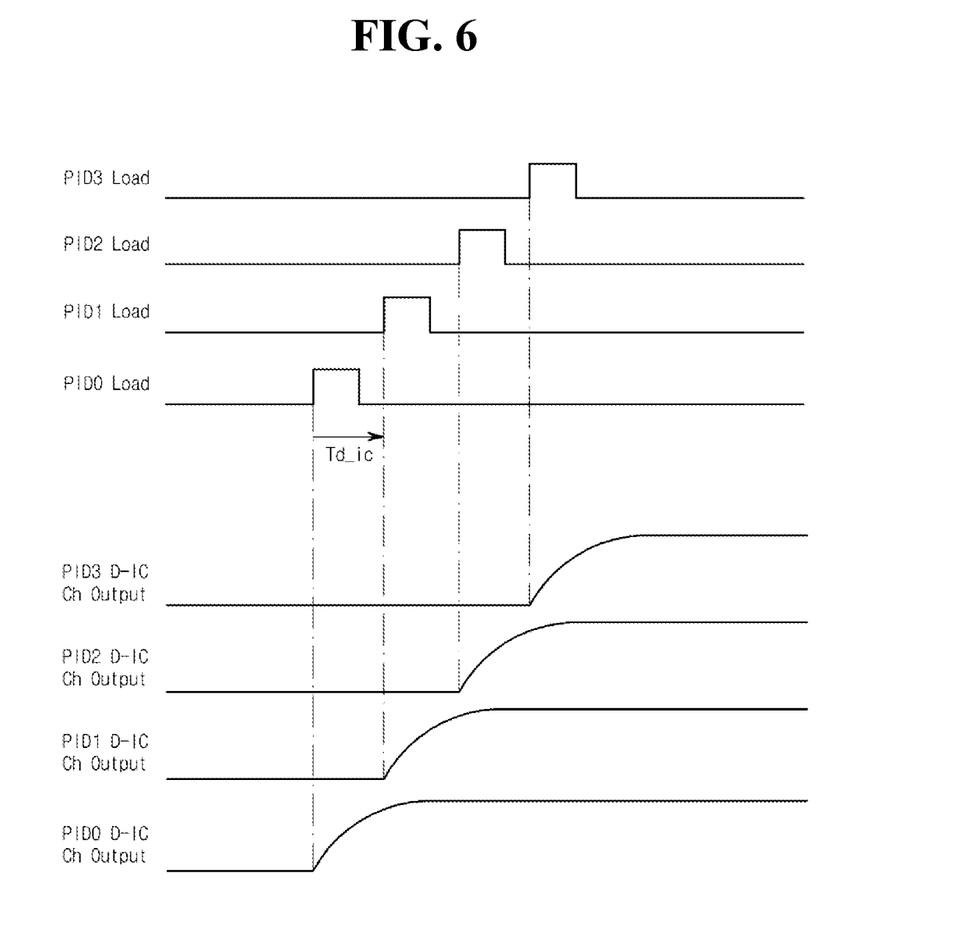
FIGS. 6 and 7 are timing diagrams illustrating examples of the timing delay operation of the display driver IC.
Figure 7:
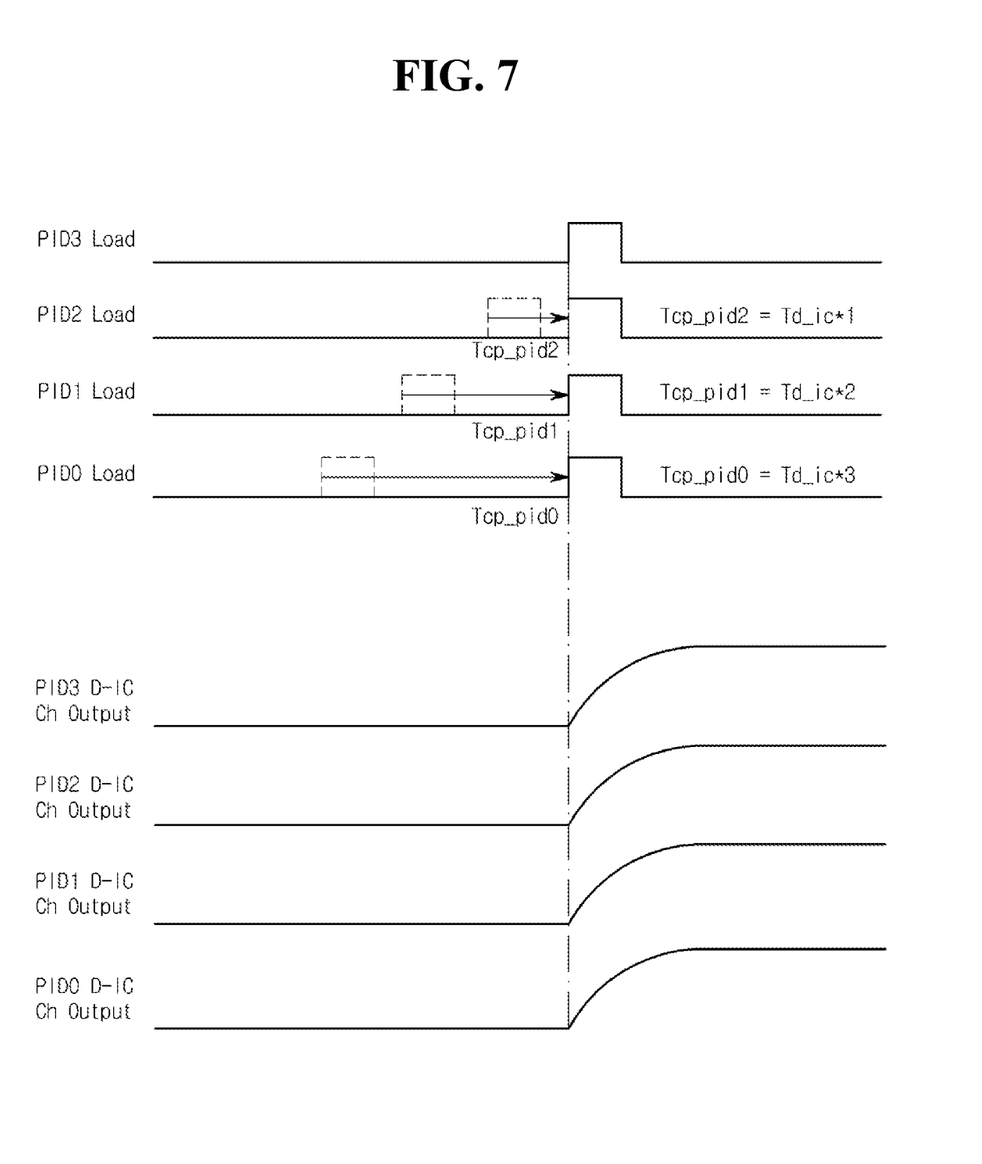

FIG. 4 is a block diagram illustrating an example of the display driver IC in one or more examples. FIG. 5 is a timing diagram for describing the operation of the display driver IC. FIGS. 6 and 7 are timing diagrams for describing the timing delay operation of the display driver IC according to the embodiments of the present disclosure.

In FIG. 4, the display driver IC shown in FIG. 4 may further include a delay unit 155 for delaying the data voltage provided to the display panel 110.

The delay unit 155 may delay the image data 32 included in the data packet 30 for a certain period of time and then provide it to the driving unit 150. Specifically, the delay unit 155 may generate a compensation time on the basis of the panel identifier included in the control data 31, and may delay the image data 32 for a delay time, and then may provide the image data 32 to the driving unit 150. As a result, the display panel 110 displays the delayed image by the compensation time by the operation of the delay unit 155 from a time for which the original image is displayed.

In FIG. 5, shown is a timing diagram for describing a general driving feature of the display driver IC 120. The control data 31 included in the data packet 30 may include a load signal which indicates a timing for outputting the data voltage to a channel connecting the display driver IC 120 and the display panel 110. In one or more examples, the driving unit 150 triggered by the load signal may provide the data voltage to the display panel 110.

In FIG. 6, a timing diagram illustrating an example of a general driving feature of the display driver IC 120 when a delay operation by the delay unit 155 is not performed is shown.

The multi-vision display system configured by sequentially connecting the plurality of display devices 100, 200, 300, ..., and 1000 receives, as described above, data packets 30 from one timing controller 20. Each of the display driver ICs included in the display device extracts the image data 32 from the data packet 30 provided from the timing controller 20 or the display driver IC connected to the front end, and provides the data packet 30 to the rear end display driver IC again.

In the process of providing the data packet 30 to another display driver IC, a timing at which each display driver IC outputs to the display panel, that is, a timing of providing the load signal may be slightly delayed. This may be a delay time generated by a signal transmission time between the display driver ICs and a data processing time of the display driver IC.

In FIG. 6, a load signal PID0 Load output from the display driver IC included in the first display device 100 and an output timing of the data voltage provided to the display panel in response to the load signal are shown. Subsequently, shown is a load signal PID1 Load output from the display driver IC included in the second display device 200 after the above-described delay time Td_ic, the data voltage is output to the display panel in response to the load signal.

The display devices connected to the rear end of the second display device also output the data voltage later than the front end display device by the delay time.

That is, the display devices connected to the rear end output the image as late as the delay time Td_ic compared to the front end display devices. This is accumulated more and more with the lapse of time and a delayed image output may be recognized by the user. Therefore, in the display driver IC included in the display devices, it is required to compensate for this delay and to output the image to the display panel at a synchronized timing.

In FIG. 7, a timing diagram illustrating an example of a case in which the delay time is compensated by the delay operation by the delay unit included in the display driver IC is shown.

Each of the display driver ICs included in the plurality of display devices 100, 200, 300, ..., and 1000 may generate a compensation time on the basis of the panel identifier included in the received data packet 30 and may delay the data voltage by the compensation time and then provide the data voltage to the display panel.

The first display driver IC 120 connected to the foremost end among the plurality of cascade-connected display driver ICs requires the longest compensation time in order to synchronize the image output timing with the display driver IC connected to the rearmost end. Assuming that n is number of display devices are cascade-connected, the compensation time Tcp_pid0 generated by the first display driver IC 120 is Td_ic×(n−1). The first display driver IC 120 delays for the compensation time Tcp_pid0 and generates a load signal, and then outputs a data voltage to the first display panel 110.

The display driver ICs connected to the rear end can also generate the delay time in the same manner. The compensation time Tcp_pidi generated by the i-th connected display driver IC is represented by the following general formula.

$$Tcp\_pidi = Td\_ic \times (n-PIDi-1)$$

Here, n is the number of connected display devices, Td_ic is a delay time per display driver IC, and PIDi is a panel identifier of the i-th connected display driver IC.

As such, the multi-vision display device according to the embodiments of the present disclosure can compensate for the image output delay due to data transmission by supplying a data voltage to the display panel at a delayed timing in accordance with the compensation time generated by each of the cascade-connected display driver ICs. Therefore, delay difference may not occur in the image output for each of the plurality of display panels.

Also, the compensation time generated by the display driver ICs may be, as described above, generated based on the panel identifier provided to each of the display driver ICs. Therefore, when configuring a multi-vision display system with a new layout, it is not necessary to change the setting for delay even though the order of the disposition or arrangement of the plurality of display devices is changed.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multi-vision display device comprising:
a timing controller configured to receive source data and timing signals from a host, and generate a data packet comprising image data and control data;
a plurality of display panels; and
a plurality of display driver integrated circuits (ICs) cascade-connected to each other and each connected to any one of the plurality of display panels,
wherein each display driver IC comprises a driving unit configured to extract the image data corresponding to a panel identifier included in the control data and generate a data voltage driving a corresponding display panel,
wherein the data packet is a set of single control data and multiple image data arranged in a serial format,
wherein the image data included in the data packet is classified as PID0 to PIDn-1 according to the panel identifier when the multi-vision display device comprises n display driver ICs respectively connected to a corresponding display panel,
wherein the image data classified as PID0 to PIDn-1 is sequentially provided to first to nth display driver ICs cascade-connected to each other, where n is an integer greater than 2,
wherein each of the plurality of display driver ICs comprises:
a decoder configured to decode the data packet comprising image data and control data; and
a panel identifier modulator connected to the decoder and configured to:
modulate the panel identifier included in the control data and provided from the decoder, and
provide the modulated panel identifier to an encoder configured to generate an encoded data packet comprising image data and control data including the modulated panel identifier, and wherein the encoded data packet is provided from a front end display driver IC to a rear end display driver IC, such that the image data classified according to the modulated panel identifier is displayed on a display panel corresponding to the rear end display driver IC.

2. The multi-vision display device of claim 1, wherein each of the plurality of display driver ICs further comprises:
a receiver configured to receive the data packet;
the driving unit configured to use the image data corresponding to the panel identifier, generate the data voltage, and provide the data voltage to the corresponding display panel; and
a transmitter configured to output the encoded data packet to a display driver IC connected to a rear end of the transmitter.

3. The multi-vision display device of claim 2, wherein the panel identifier modulator is configured to increase the panel identifier included in the control data provided from the front end display driver IC or the timing controller by 1 and generate the modulated panel identifier.

4. The multi-vision display device of claim 2, wherein the panel identifier modulator is configured to decrease the panel identifier included in the control data provided from the front end display driver IC or the timing controller by 1 and generate the modulated panel identifier.

5. The multi-vision display device of claim 2, wherein the data packet comprises a series of data packets of the image data to be displayed on the plurality of display panels during 1 horizontal cycle.

6. The multi-vision display device of claim 2, wherein each of the plurality of display driver ICs further comprises a delay unit configured to:
generate a compensation time based on the panel identifier included in the received data packet,
cause the driving unit to delay the data voltage, generated by using the image data corresponding to the panel identifier, by the compensation time, and
provide the delayed data voltage to the display panel to synchronize image output timing between the plurality of display driver ICs cascade-connected to each other.

7. The multi-vision display device of claim 6, wherein the delay unit is configured to generate the compensation time based on a delay time per display driver IC, the panel identifier provided to each of the display driver ICs, and a number of connected display devices.

8. The multi-vision display device of claim 2, wherein the data packet encoded by the encoder comprises data equal to the image data generated by the timing controller.

9. The multi-vision display device of claim 2, wherein the rear end display driver IC is configured to extract the image data corresponding to the modulated panel identifier from the encoded data packet and provide it to the driving unit.

10. The multi-vision display device of claim 2, wherein the decoder is configured to decode a serial data packet received by the receiver and convert the serial data packet into a parallel data packet.

11. A display driver IC comprising:
a receiver configured to receive a data packet comprising image data and control data;
a decoder configured to decode the received data packet;
a driving unit configured to extract the image data corresponding to a panel identifier included in the control data, and generate a data voltage driving a display panel,
wherein the data packet is a set of single control data and multiple image data arranged in a serial format,
wherein the image data included in the data packet is classified as PID0 to PIDn-1 according to the panel identifier when a multi-vision display device comprises n display driver ICs respectively connected to a corresponding display panel,
wherein the image data classified as PID0 to PIDn-1 is sequentially provided to first to nth display driver ICs cascade-connected to each other, where n is an integer greater than 2;
a panel identifier modulator connected to the decoder and configured to:
modulate the panel identifier included in the control data and provided from the decoder; and
provide the modulated panel identifier to an encoder configured to generate an encoded data packet comprising image data and control data including the modulated panel identifier provided to a rear end display driver IC; and
a transmitter configured to output the encoded data packet to the rear end display driver IC, and
wherein the encoded data packet is provided from a front end display driver IC to the rear end display driver IC, such that the image data classified according to the modulated panel identifier is displayed on a display panel corresponding to the rear end display driver IC.

12. The display driver IC of claim 11, wherein the panel identifier modulator is configured to increase the panel identifier included in the control data provided from a timing controller or the front end display driver IC by 1 and generate the modulated panel identifier.

13. The display driver IC of claim 11, wherein the panel identifier modulator is configured to decrease the panel identifier included in the control data provided from a timing controller or the front end display driver IC by 1 and generate the modulated panel identifier.

14. The display driver IC of claim 11, further comprising a delay unit configured to:
generate a compensation time based on the panel identifier included in the received data packet,
cause the driving unit to delay the data voltage, generated by using the image data corresponding to the panel identifier, by the compensation time, and
provide the delayed data voltage to the display panel to synchronize image output timing between a plurality of display driver ICs cascade-connected to each other.

15. The display driver IC of claim 14, wherein the delay unit is configured to generate the compensation time based on a delay time per display driver IC, the panel identifier provided to each display driver IC, and a number of connected display devices.

16. The display driver IC of claim 11, wherein the data packet encoded by the encoder comprises data equal to the image data included in the received data packet.

17. The display driver IC of claim 11, wherein the display driver IC connected to the rear end display driver IC is configured to extract the image data corresponding to the modulated panel identifier from the encoded data packet and provides it to the driving unit.

18. The display driver IC of claim 11, wherein the decoder is configured to decode a serial data packet received by the receiver and convert the serial data packet into a parallel data packet.

* * * * *